United States Patent [19]

Merritt et al.

[11] Patent Number: 4,510,377

[45] Date of Patent: Apr. 9, 1985

[54] SMALL CARTRIDGE HEATER

[75] Inventors: Francis L. Merritt, Redondo Beach; Charles H. Taylor, Rolling Hills, both of Calif.

[73] Assignee: The United States of America as represented by the Secretary of the Air Force, Washington, D.C.

[21] Appl. No.: 577,391

[22] Filed: Feb. 6, 1984

[51] Int. Cl.³ .............................................. H05B 3/02
[52] U.S. Cl. .................................. 219/550; 60/200.1;
219/523; 219/530; 219/541; 219/552; 338/241;
338/303; 338/326
[58] Field of Search ............... 338/63, 238, 239, 240,
338/241, 303, 326; 219/523, 530, 541, 544, 550,
552, 270; 60/909, 200.1; 415/214

[56] References Cited

U.S. PATENT DOCUMENTS

| | | | |
|---|---|---|---|
| 1,899,933 | 3/1933 | Bennett | 219/550 |
| 2,088,586 | 8/1937 | Cole et al. | 338/241 |
| 2,280,367 | 4/1942 | Barton | 338/241 |
| 2,379,530 | 7/1945 | Lederer | 338/303 X |
| 2,394,611 | 2/1946 | Hickernell et al. | 174/101.5 |
| 2,780,703 | 2/1957 | Macintire | 338/240 |
| 2,856,500 | 10/1958 | Hartman | 219/536 |
| 2,863,032 | 12/1958 | Morris | 174/109 |
| 2,898,571 | 8/1959 | Moule et al. | 338/238 |
| 3,102,940 | 9/1963 | Stone | 219/550 X |
| 3,476,915 | 11/1969 | Rapsis | 219/523 |
| 3,612,822 | 10/1971 | Edin | 219/275 |
| 3,694,628 | 9/1972 | McGwire et al. | 219/550 |
| 3,983,361 | 9/1976 | Wild et al. | 219/523 X |
| 4,169,351 | 10/1979 | Barber | 60/200.1 X |
| 4,288,982 | 9/1981 | Kuenzly et al. | 60/200.1 |
| 4,305,247 | 12/1981 | Ellion et al. | 60/200.1 |
| 4,426,568 | 1/1984 | Kato et al. | 219/270 |

OTHER PUBLICATIONS

G. W. Joseph, Improved Monopropellant Thruster Heaters, (AFRPL-TR-81-49), Jul. 1981, available through DTIC AD B060333L, (with distribution list).

Primary Examiner—Volodymyr Y. Mayewsky
Attorney, Agent, or Firm—Donald J. Singer; Bernard F. Franz

[57] ABSTRACT

A cylindrical core of a ceramic such as alumina ($Al_2O_3$) has grooves in the form of a double lead thread. A coil of Nichrome V is placed in the grooves, starting in one lead of the thread and returning in the other. A split ring of a ceramic such as beryllia surrounds the core. The heater is enclosed in a housing of a metal such as Inconel 600. The entire cartridge is only one inch long and 3/16 inch diameter. It is used as a catalyst bed heater for a satellite thruster.

5 Claims, 6 Drawing Figures

U.S. Patent  Apr. 9, 1985  4,510,377
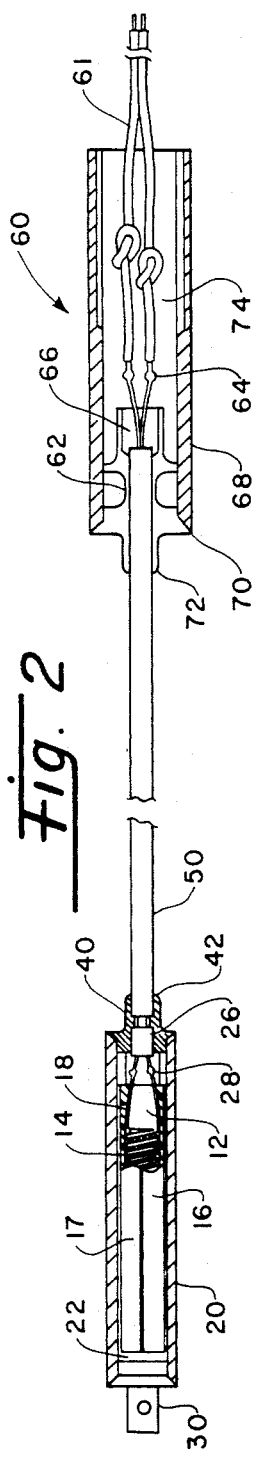
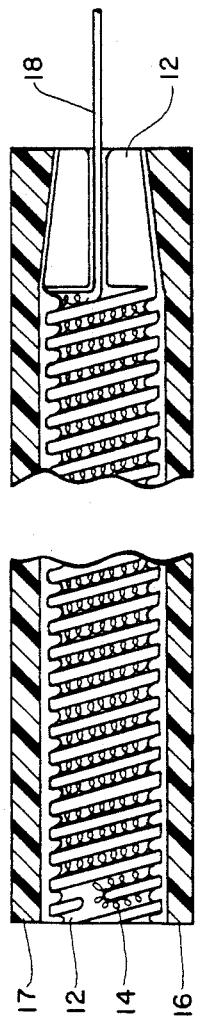
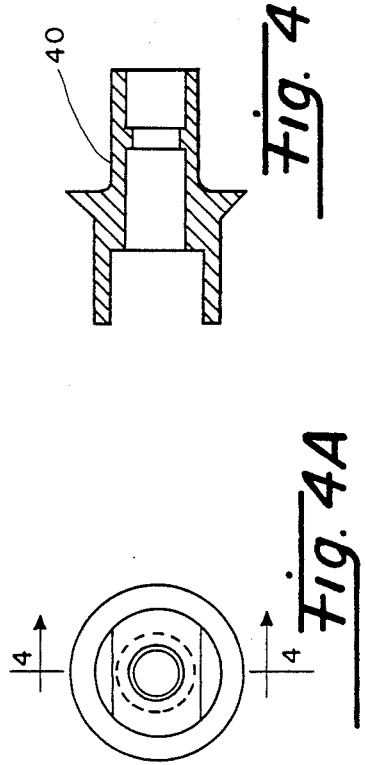
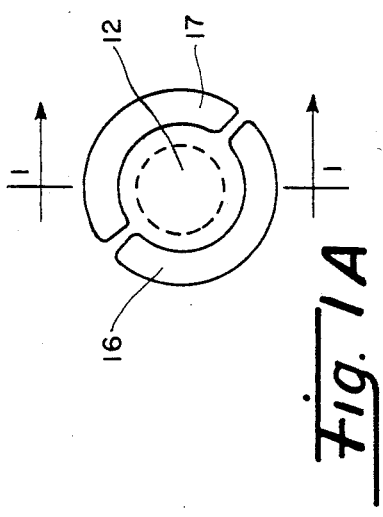
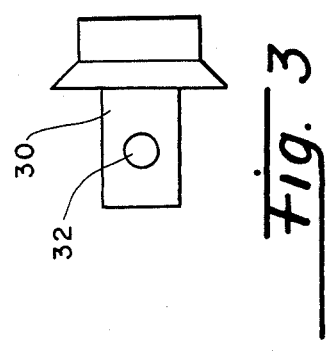

SMALL CARTRIDGE HEATER

RIGHTS OF THE GOVERNMENT

The invention described herein may be manufactured and used by or for the Government of the United States for all governmental purposes without the payment of any royalty.

BACKGROUND OF THE INVENTION

This invention relates to a small cartridge or probe type heater, e.g. to a tubular sheathed heating element of small diameter, having a particular application to spacecraft thrusters.

An interesting tubular sheathed heating element of small diameter is shown in U.S. Pat. No. 2,898,571 to Moule et al, for application to diesel glow plugs for compression ignition engines. It has a helical element placed in a magnesium tube, which in turn is placed in a sheath. The element is heat treated to convert the magnesium to magnesium oxide insulation.

Catalyst bed heaters are extensively employed on operational spacecraft monopropellant propulsion subsystems. Probe type heaters for catalyst bed heaters have had various problems, such as element resistance shift, insulation resistance drop, shorting of lead wires, fatigue stress at element to lead wire weld joints, and others.

The function of the catalyst bed heater is to maintain the bed at a temperature which provides improved consistent performance for each pulse. Although the catalyst bed heater is not mandatory requirement for a monopropellant catalytic thruster (because the thruster will function without it), it serves to provide predictable pulses, impulse repeatability and increase catalyst bed lifetime. An important function of the catalyst bed heater is to prevent catalyst bed degradation from cold starts which promotes bed breakup. Therefore, the basic requirement for this type heater is to maintain the bed at a minimum predetermined temperature (usually greater than 200° F.) under worst case conditions.

The prior art include a reflector type space heater in which the heating unit at the center has a truncated-cone-shaped ceramic core with a groove in the form of a single lead thread. The wire element is a coil which has a small helical diameter compared with the diameter of the core at its small end. The coil is laid in the groove of the core, with a straight uncoiled end of the wire returned through the inside of the core. The depth of the groove is only about half the coil diameter.

SUMMARY OF THE INVENTION

An object of the invention is to overcome the problems with prior designs, and to provide more heating surface and better heat distribution. The primary limitation in the power available from a small cartridge heater is the length of element wire and heat emitting surface that can be packaged in a given envelope. The element should also be located as near to the heat emitting surface of the heater as possible.

The heater according to the invention uses a helical heating element which is placed in a double lead thread on an alumina ($Al_2O_3$) rod, and enclosed in an insulating sheath of material such as beryllia or alumina. The sheath is preferably a split ring, and the assembly is enclosed by a housing of a metal such as Inconel 600.

The use of high purity beryllia for the sheath is a feature of the invention.

BRIEF DESCRIPTION OF THE DRAWING

FIG. 1 is a view along the length of a probe type heater, with an insulating ring shown sectioned;

FIG. 1A is a view of the left end of FIG. 1;

FIG. 2 is a reduced view, partly broken away and sectioned, along the length of the complete heater of FIG. 1 in its housing, along with a high temperature lead section and a transition section to regular leads;

FIG. 3 is a side view of an end plug for the housing;

FIG. 4 is a longitudinal sectional view of a housing sleeve at the lead end taken along lines 4—4 of FIG. 4A; and FIG. 4A is end view of the sleeve of FIG. 4.

DETAILED DESCRIPTION

The heater as shown in FIG. 1 comprises a core or mandrel 12, a heating wire 14, and a split insulating ring comprising two halves 16 and 17. As shown in the end view of FIG. 1A, the two halves of the split ring are placed around the core 12 meeting along lengthwise lines or having slight gaps 15 and 15'. The section lines 1—1 in FIG. 1A should be understood as going through the two halves 16 and 17 of the insulating ring, but around the core 12, so that the ring is shown in section in FIG. 1, and the core 12 with the winding in elevation. Note that the junction line or gap 15' is hidden in FIG. 1, with the dashed lines omitted for clarity.

The core or mandrel 12 is made of an insulating refractory ceramic, preferably alumina ($Al_2O_3$). A double lead thread groove is formed along the length, except for a tapered portion at the right which has two straight longitudinal grooves on opposite sides. One of the longitudinal grooves joins with the first thread groove, and the other (not visible in FIG. 1) joins with the second thread groove. At the left end a connecting groove is formed to join the grooves of the two threads. In an embodiment which was built and tested, the core 12 is 0.70 inch long and 0.106 inch in diameter. The groove width and depth is 0.012–0.013 inch, with the bottom of the grooves anywhere from flat to full radius. The barrier between grooves is 0.010–0.011 inch.

The heating element wire 14 is preferably of Nichrome V, 0.0015 inch in diameter and 32.56 inches long, wound on a 0.006 inch mandrel with approximately 1382 turns, having a resistance of 784 ohms. The winding mandrel is removed, and a short gold-plated platinum wire 18, 0.010 inch in diameter may be brazed to each end. The coil 14 is placed in the thread grooves of the core 12, doubling back at the left end. The platinum end wires go in the longitudinal grooves at the right end, and extend slightly beyond the core 12.

The split ring 16-17 is made of an insulating refractory ceramic, which may be alumina, but is preferably beryllia (BeO) in the alpha crystalline form. BeO has an unusually high thermal conductivity at room temperature approximately a mangitude higher than most oxides and better than most metals. The conductivity decreases with increasing temperature, and is strongly dependant upon impurities, grain size, density and porosity. The preferred form of BeO is that sold under the trademark BERLOX ® K-150. The split ring 16-17 is the same length as the core 12. The inner and outer diameters are 0.109 and 0.154 inch. Each end around the circumference of each half is permitted to be a maximum of 0.020 inch short of a line through the center of the circle, which would leave slight gaps as shown in FIG. 1A. At the right end, the inside of the ring has a taper which corresponds to that of the core 12.

FIG. 2 shows the heater in a housing 20, which is a tube of refractory metal, such as Inconel 600. The tube is 1.000 inch long, with inner and outer diameters of 0.157 and 0.1875 (3/16) inch. Both ends have a chamfer inward at 45 degrees. In FIG. 2, the heater is shown rotated so that one lengthwise joining line 15 between the two halves 16 and 17 of the split ring is shown centered, and both end wires 18 in the longitudinal grooves at the right end of the core 12 are visible. Note that the housing tube 20 is shown sectioned along its entire length; the split ring 16–17 is shown viewed in elevation at the left, but broken away and shown sectioned at the right; the core 12 with its winding and leads appears in elevation at the right; a sleeve 40 forming part of the housing is shown in section at the right; and other components at the left appear in elevation.

At the left end of the housing are a spacer 22, and an end plug 30. The spacer is a 4-hole alumina tube with a 0.156-inch outer diameter, and a thickness of 0.010–0.020 inch. The end plug 30 is also shown in FIG. 3. It is of the same metal as the housing 20, and is 0.1205 inch long overall. The right end which goes inside the housing has a diameter of 0.155 inch followed to the left by a chamfer at 45 degrees to a diameter of 0.188 inch. The total length of the right end of the plug and the chamfer portion is 0.075 inch. The left end which extends outside the housing has a diameter of 0.085 inch. There is a hole 32 through the left end of 0.037 inch diameter, centered 0.065 inch from the chamfer. Note that the chamfer of the end plug 30 mates with the inside chamfer of the housing tube 20.

Inserted in the right end of the housing tube 20 is a sleeve 40 (also shown in FIGS. 4 and 4A) of the same metal. The inside diameter of the sleeve is 0.064 inch, except for a neck 0.062 inch from the right end with a diameter of 0.055–0.058 inch and length of 0.020 inch, and a portion at the left end 0.090 inch long with an inner diameter of 0.105 inch. The outside diameter is 0.155 inch at the left and 0.090 inch at the right. There is a chamfer at 45 degrees from the diameter at the left end to a diameter of 0.188 inch. The length of the left end including the chamfer (which goes into the housing 20) is 0.150 inch. The overall length of the sleeve is 0.280 inch. A left end view of the sleeve is shown in FIG. 4A. Both ends of the housing 20 have T.I.G. welds 360° to join it to the end plug 30 and the sleeve 40, to provide a tight seal.

A heat resistant lead arrangement 50 is used to make an electrical connection to the heater. It may comprise platinum conductors in a platinum sheath with MgO insulation. The MgO insulation is initially in the form of beads. The sheath is swaged (squeezed by appropriate means such as rollers) which crushes the beads to a packed powder. The sheath fits into the sleeve 40 up to the neck, and is sealed thereto at the right end by microbaze 42.

Before assembly of the split ring 16–17 and the housing, a 2-hole alumina tube 26 of 0.062 inch outer diameter, 0.1015 inch inner diameter and 0.110–0.120 length is inserted into the center of the sleeve 40, with the leads passing through. The leads are connected to the platinum wires 18 by a gold braze 28. The left end of the sleeve 40 is backfilled with $Al_2O_3$ powder.

A high/low temperature transition section 60 is provided for the leads. It comprises a body header 62 of 316 CRES into which the lead arrangement 50 is inserted. The platinum leads are connected to leadwire 61 (MIL-W-16878) by easy-flow 45 braze alloy 64. The lead wires are knotted for strain relief. The right end of the body header 62 is filled with glass insulation 66. A transition sleeve 68 of 316 CRES is sealed to the body header 62 at the left end 70 by a T.I.G. weld 360°. The body header is sealed to the sheath of the lead arrangement 50 by easy-flow 45 braze alloy 72. The right end of the sleeve 68 is filled with potting compound 74. The transition sleeve 68 has an outside diameter of 0.25 inch, and maximum length of 1.00 inch. The distance along the lead arrangement 50 between the transition sleeve 68 and the housing 20 is 3.00 inches.

Note that many of the structural features of the specific embodiment described above are taken from previous designs for thruster heaters, with improvements relating to the double lead helix and the sheath of beryllia.

The "probe" catalyst bed heater for a 1.0 pound force size thruster demonstrated capabilities beyond the original design goals. It provides more heating surface and better heat distribution in a small envelope than prior designs.

The primary limitation in the power available from a small cartridge heater is the length of element wire and heat emitting surface that can be packaged in a given envelope. The element should also be located as near to the heat emitting surface of the heater as possible.

The double lead helix design shown in FIG. 1 plus the helical wound element optimizes the packaging objective. In addition, all of the element is positioned an equal distance from the surface of the cartridge, eliminating potential hot spots resulting from a layered element insulator configuration.

The best heat conduction possible is needed between the heating element and the surface of a heater. Beryllia is a superior ceramic heat conductor at high temperatures but tends to be undesirable where fabrication of complex shapes is required. The use of a simple cylindrical sleeve 17 provides the needed conduction without the necessity of making the more complex element support of beryllia. As shown in the drawing, the element support 12 may be made of alumina as in previous designs.

Future missions will require high reliability and long-life components in satellites. The use of the helix wound cartridge heater insulator in cartridge catalyst bed heaters can significantly improve the reliability and life capability of monopropellant catalytic engines for use in future satellites.

Thus, while preferred constructional features of the invention are embodied in the structure illustrated herein, it is to be understood that changes and variations may be made by the skilled in the art without departing from the spirit and scope of our invention.

We claim:

1. A heater in the form of a small cartridge of the order of one inch long; with a smaller diameter, for use as a catalyst bed heater in a spacecraft thruster, to maintain the bed at a predetermined temperature greater than 200° F., said heater comprising:

a cylindrical core made of an insulating refractory ceramic, said core having grooves in the form of a double lead helical thread formed in the surface thereof;

a wire element in the form of a helical coil located in said grooves, starting in one lead and returning in the other lead in a single layer, the coil axis being along the length of the grooves;

said wire element located near the heat emitting surface of the heater and the wire element positioned an equal distance from the surface of said core;

an outer ring of electrically insulating but heat conducting refractory ceramic material in tubular form surrounding said core, said outer ring being split and formed from two symmetrical halves lengthwise, having inner and outer surfaces of simple cylindrical form at least for the portion surrounding the helical thread; and a housing having a tubular portion surrounding said outer ring;

the size of the wire element, and the heat conduction from the wire element through the outer ring and the housing, being adequate to maintain said temperature at the bed.

2. A heater according to claim 1, wherein the material for said outer ring is high purity beryllia, in the form sold under the trademark BERLOX K-150 or equivalent.

3. A heater according to claim 2, wherein the material for said core is alumina, so that the outer ring using a material for good heat conduction is of simple-to-fabricate form, while the core requiring a complex shape uses a more easily fabricated material.

4. A heater according to claim 1, wherein said core has a tapered portion at one end extending beyond said double lead helical thread, with two straight longitudinal grooves on opposite sides which respectively join the two parts of the grooves of the double lead helical thread, for lead wires connected to the ends of said wire element:

wherein said outer ring has the outer surface of simple cylindrical form for the entire length, wherein the inner surface has a taper at one end to match that of the tapered portion of the core, and wherein the housing is of heat-resistant metal, the housing being comprised of a tubular part surrounding said outer ring, an end plug closing one end, and a sleeve in the outer end with means for entering the electrical leads connected to the coil, the housing being completely sealed.

5. A heater according to claim 4, wherein the material for said core is alumina ($Al_2O_3$), the material for said outer ring is high purity beryllia, in the form sold under the trademark BERLOX K-150 or equivalent, and the material for the wire element is Nichrome V, so that the outer ring using a material for good heat conduction is of simple-to-fabricate form, while the core requiring a complex shape uses a more easily fabricated material.

* * * * *